2,763,694

CATALYTIC WATER GAS ADDITION TO UNSATURATED HYDROCARBONS

Karl Büchner, Duisburg-Hamborn, and Paul Kühnel, Oberhausen-Holten, Germany, assignors to Ruhrchemie Aktiengesellschaft, Oberhausen-Holten, Germany, a German corporation No Drawing. Application November 21, 1950, Serial No. 196,932

Claims priority, application Germany November 28, 1949

5 Claims. (Cl. 260—604)

This invention relates to improvements in the catalytic water gas addition to unsaturated hydrocarbons.

In French Patent No. 860,289, there is described a method for the catalytic addition of carbon monoxide and hydrogen to unsaturated hydrocarbons, which method is generally known as hydrocarbon formylation. In order to carry out this method, reduced cobalt or iron catalysts have been used, as they are for instance preferentially employed in the catalytic hydrogenation of carbon monoxide. The formylation has been carried out hitherto with metallic catalysts which have been converted from corresponding oxides into the metallic state by the use of hydrogen or other reducing gases. At least 1.6 g. of metal are generally required for every 1000 cc. of the starting material to be formylated; smaller quantities of metal increase the reaction time, higher quantities bring about no advantage. In the addition reaction, however, such catalysts have the disadvantage of producing reaction products which are generally black and sometimes dark brown or reddish brown. This undesired coloration is brought about by metals, particularly cobalt and iron which are dissolved in the reaction products. The reaction product is scarcely coloured at a content of up to 5 mg. cobalt per liter, slightly yellow at a content of 15 mg. cobalt per liter, light brown at a content of 100 mg. cobalt per liter, dark brown at a content of 500 mg. cobalt per liter, and black at a content of 1000 mg. cobalt per liter. The iron content of the formylation products comes from the material of the reaction vessels or from the watergas which may contain per m.$^3$ from 3 to 10 mg. ferrous carbonyl.

When using magnesia-containing catalysts, magnesium also can generally be found in the reaction products. The said metals can be removed from the formylation products with inorganic or organic acids or acid salts. Such purification requires, however, additional operations and reduces the yield.

The metal content of the addition products depends to a large extent on the working conditions. Aldehyde mixtures which contain 30–60% aldehydes, in addition to unreacted hydrocarbons, generally have a metal content such as cobalt of 0.4 to 1.5 grams per liter and at times contents of up to 6 grams such as of cobalt per liter are noted. Furthermore, there are present varying quantities of iron, generally 200–400 mg. Fe per liter. When using a conventional carbon monoxide hydrogenation catalyst containing cobalt, thorium oxide, magnesium oxide and kieselguhr, the magnesium content of the crude aldehyde may be about 1 to 3 mg. per liter.

It has now been found that addition products are contaminated only to a very slight extent with their dissolved metals if the catalysts used are composed of compounds of metals of the 8th group of the periodic system which are not reduced to metallic form. All of the metals of this group are suited which are able to form hydrocarbonyl, for example cobalt, iron, osmium, but not for instance nickel or platinum. Cobalt is the best suited metal. The unreduced metal compound of this kind must exhibit an acid reaction and preferably possess a concentration of hydrogen ions to give a pH of 1 to 3. The customary reduction of the metal compounds which are to be used as catalysts is therefore unnecessary and would even be injurious, because it would bring about a high metal content of the reaction products. The sulfates of the said metals are particularly well suited as catalysts, also chlorides may be used. Nitrates are unsuited. Oxides and carbonates are solid substances which are reduced in the formylation reaction.

If cobalt carbonate is precipitated on magnesia as carrier in the manner conventionally used today, and this catalyst material is reduced under normal conditions, aldehydes are produced in a subsequent formylation which have a metal content of, for instance, 1.5 grams of cobalt per liter. With a catalyst material containing neutral cobalt carbonate and acid magnesium oxide-chloride as a carrier, which is not reduced prior to the catalytic addition of water-gas, there are produced aldehydes having a considerably lower metal content. Furthermore, the reaction products obtained with such catalysts have a lower density and a lower refractive index. These properties show, with the same or even increased aldehyde content, a reduced content of heavy oils, there being understood by heavy oils, polymerization and condensation products which are formed during the addition reaction due to undesired side reactions. Furthermore, the catalyst substances carried on magnesium oxide-chloride are considerably harder and less subject to wearing off than conventional kieselguhr-metal catalysts. For catalysts in the acid range, the ratio of MgO to MgCl$_2$ must not exceed 3:1.

The preparation of the catalysts described above is very simple. By way of example, a thin paste is first produced from neutral cobalt carbonate, magnesium oxide and hydrochloric acid, which paste, after two to three hours, becomes sufficiently plastic that it can be worked into filaments or other contact shapes in the customary catalyst shaping equipment. This treatment was carried out, for instance, for a period of two hours in a filaments shaping press. The thin filaments of the catalyst thus prepared are heated to approximately 105° C. in a drying chamber. By this drying, the catalyst mass loses approximately 6% adherent water and approximately 16% water of crystallization. Of the 11 mols. of water of crystallization present in magnesium oxide-chloride, this means a relinquishing of 5 mols. of water of crystallization so that 6 mols. of water of crystallization remain for every molecule of MgCl$_2$.

In watergas addition reactions, such a catalyst gives, without previous reduction, a 95% conversion of the olefins used. For every 100 cc. of a hydrocarbon mixture containing 50% olefins by volume, there are preferably used 7 grams of cobalt = 47 grams of said catalyst. The temperature may be about 120° C.–220° C. The most favorable reaction temperature is about 135 to 145° C. with the reaction pressure at about 145–155 and preferably 150 kilos per sq. cm. and at a time of reaction of about two hours. The aldehydes produced in this manner contain only approximately 100 to 190 mg. of cobalt per liter.

If said catalyst is slightly reduced, the reaction time will be shortened, but the cobalt content of the aldehyde obtained will be increased to almost twice the amount. In order to reduce the undesired metal content of the aldehydes, the use of unreduced catalysts is therefore essential.

Also, catalysts having an alkaline reaction will increase the dissolved metal content. With a catalyst, the carrier of which consists of magnesium oxide-chloride and which contains approximately 4 mols of MgO for each mol of $MgCl_2$, there are obtained aldehydes which have approximately 1400 mg. of metallic cobalt per liter.

Aldehydes having a particularly low metal content can be obtained if the operation is carried out with unreduced catalysts in the acid range. A catalyst which is particularly well suited for this purpose, consists, for example, of a mixture of cobalt sulphate and gypsum or magnesium sulphate, sufficient sulphuric acid being added to this mixture to adjust its pH value to 1–3. With this catalyst, the olefin addition gives yellow aldehydes, which still contain only 15 mg. cobalt. The simultaneously present iron, the greater part of which comes from the reaction vessels used, amounts to about 50 mg. per liter. When the free sulfuric acid is neutralized to a pH of 3, the iron drops to 15 mg./liter, but the cobalt increases to 50 mg. cobalt/liter. Water gas can only be added with difficulty to olefins, with catalysts having a pH of more than 7.

The use of the catalysts in accordance with the present invention has numerous advantages. Unreduced catalysts prepared with carriers of alkaline earths can be frequently reused without any intermediate treatment, whereas the reduced catalysts which are customarily used today must be reactivated after the completion of each addition reaction by an intermediate hydrogen treatment if a large part or even all of the metal cobalt is not to be dissolved out of the catalyst. With an unreduced cobalt catalyst precipitated on magnesium-chloride, more than 20 charges can, for example, be treated.

Due to their great hardness, the catalysts in accordance with the invention can be stationarily arranged within the reaction vessels and be used for continuous operation.

The addition of carbon monoxide and hydrogen to unsaturated hydrocarbons can be effected with even better results if the metal compounds serving as catalysts are used in the form of an acid reacting aqueous metal salt solution. The use of cobalt salts, particularly cobalt sulphate alone or mixed with other sulphates, is particularly advantageous. The concentration of the aqueous cobalt sulphate solution should be 100 to 400 grams cobalt-sulfate-heptahydrate ($CoSO_4.7H_2O$) and preferably 325–375 grams.

The acidification of the metal salt solutions is suitably carried out down to a pH value of less than 7, and preferably to a pH of 1–3. In view of the reaction vessels, nitric acid is preferably used for the acidification inasmuch as in this case the customary acid resistant chrome nickel steels can be used. If acid products of the catalytic carbon monoxide hydrogenation are to be used, there is no need for a special acidification of the metallic salt solution.

The metallic salt solution used as catalyst, preferably a cobalt sulphate solution, is brought together with the olefin mixture to be treated, in a reaction vessel and intimately distributed therein by agitators or hydrostatic mixing. Generally 50 to 2000 cc. and preferably 75–125 cc. of aqueous salt solutions of the above concentrations may be used per liter of the hydrocarbon mixture to be treated.

When using metal salt solutions, the addition of the carbon monoxide-hydrogen mixture may be carried within as wide a range as between 120 and 220° C. but preferably 140 and 160° C. The temperature range is considerably greater than when using reduced metal catalysts which generally are restricted to temperatures of 130 to 160° C. The substantially larger temperature range makes possible a removal of the reaction heat from the reaction vessel. The reaction time is also considerably less in connection with dissolved metal salt catalysts and can be reduced to approximately 30 to 60 minutes, while when using solid salt catalysts, reaction times of 90 to 180 minutes may be usually required.

In addition to a considerably shortened time of reaction there is the further advantage of the separation of the catalyst, dissolved in water, from the water insoluble products by simple decantation, possibly in the reaction vessel itself, or in the case of water soluble reaction products, by distillation. The use of filters and the difficulties connected therewith are completely avoided. The metal salt solution can be used over again as frequently as desired, without any decrease in its activity. The metal losses which occur amount, for instance, to only 0.015 to 0.030 grams of metallic cobalt per liter of reaction product as compared with the 1.5 to 6 grams metallic cobalt per liter of reaction product as compared with the 1.5 to 6 grams metallic cobalt per liter of reaction product which remain in the final product when using reduced cobalt catalysts. Due to the low metal losses, the reaction products are scarcely colored.

Finally, the reaction temperature can be exceptionally well controlled when using catalysts dissolved in water. Local super-heatings do not occur as in the case of solid catalysts so that the reaction temperature can be brought to the optimum level and thus high yields can be obtained. Furthermore, the formation of side products is suppressed to a large extent by the use of aqueous catalyst solutions, inasmuch as these solutions are not capable of activating hydrogen beyond a ratio of $CO:H_2=1:1$. Despite the increase in the temperature of the treatment, no polymerization of the reaction products takes place so that no formation of undesired heavy oils need be feared, which oils were considered unavoidable in the previously known execution of the oxo-synthesis.

The catalytic formylation may be carried out with aliphatic and hydroaromatic carbon compounds as well as with unsaturated aralkyl compounds and alicyclic unsaturated compounds, inasmuch as they are not sterically hindered by branching and do not make impossible a formylation by oxygen-containing compounds. In the latter case, the polar groups may be blocked up by esterification or similar operations, whereupon the formylation may be carried out.

Of particular advantage is the use of acid metal salt solutions instead of other catalysts in the addition of carbon monoxide and hydrogen to hydrocarbon mixtures containing organic acids in addition to unsaturated hydrocarbons. Such starting products are present, for example, when fractions of the catalytic carbon monoxide hydrogenation are to be worked.

When using reduced metal catalysts as previously customary in connection with formylation (oxo-synthesis), the catalyst is rapidly destroyed by the organic acids present in the starting product due to which the reaction stops after a short period of time or else the formation of side products is strongly favored.

*Example 1*

161 grams of magnesium-oxide (MgO), 200 grams of hydrochloric acid (35% HCl), 53 grams of water and 161 grams of neutral cobalt carbonate ($CoCO_3$) were used. The resulting catalyst was prepared and dried at 105° C. An olefin hydrocarbon mixture of molecular size $C_8$–$C_9$ was used, obtained by distillation from primary products of the carbon monoxide hydrogenation carried out with the conventional iron catalysts. This fraction showed a boiling range from 120° to 150° C. and had the following characteristics:

| | |
|---|---|
| Density $D_{20}$ | 0.782 |
| Refractive index $n_D^{20}$ | 1.4167 |
| Neutralization number | 0 |
| Ester number | 0.5 |
| Hydroxyl number | 8 |
| Carbonyl number | 10 |
| Iodine number | 107 |

1000 cc. of this mixture were mixed with 47 grams of the catalyst to form a slurry. Watergas was introduced into this slurry at a temperature of 140° C. and with a pressure of 150 kilos per sq. cm. Within 187 minutes a volume of water gas equivalent to a total of 180 kilos per sq. cm. of water-gas pressure drop were absorbed by the reaction mixture, there being a free gas space of 1200 cc. This quantity at 140° C. at a pressure of 1 kilo per sq. cm. has a volume of 216 liters at 0° C. and a pressure of 1 kilo per sq. cm.; this is equal to a volume of 140 liters. 94.5% of the olefins present had been converted into aldehydes. The reaction product obtained had a yellowish brown color and contained 81 mg. of cobalt, 53 mg. of iron and 1.8 mg. magnesium per liter. It furthermore had the following values:

| | |
|---|---|
| Density $D_{20}$ | 0.781 |
| Refractive index $n_D^{20}$ | 1.4193 |
| Neutralization number | 1.1 |
| Ester number | 5.9 |
| Hydroxyl number | 3 |
| Carbonyl number | 179 |
| Iodine number | 5 |

*Example 2*

A plastic paste having a pH of 1.6 was prepared by mixing 290 grams of gypsum, 120 grams cobalt-carbonate and 54 cc. of concentrated sulphuric acid (1.84), and a sufficient quantity of water. After sufficient hardening, 75 grams of the mass having a cobalt content of 7.7 grams cobalt and 1000 cc. of the same olefin hydrocarbon mixture as used in Example 1 were treated at 138° to 140° C. at a pressure of 150 to 170 kilos per sq. cm. with water-gas. After a period of treatment of 200 minutes, the absorption of the gas had terminated, whereupon the heating of the reaction vessel was interrupted. The reaction product contained 20 mg. cobalt, 30 mg. iron, and traces of calcium compounds per liter. The extent of the reaction, i. e. the formylation was 98%. The reaction product had the following characteristics:

| | |
|---|---|
| Density $D_{20}$ | 0.776 |
| Refractive index $n_D^{20}$ | 1.4186 |
| Neutralization number | 0.4 |
| Ester number | 4.6 |
| Hydroxyl number | 10 |
| Carbonyl number | 172 |
| Iodine number | 8 |

*Example 3*

100 cc. of a hydrocarbon mixture boiling between 130 and 145° C. which essentially consisted of $C_9$ hydrocarbons and contained 50% by volume of olefins, were brought together with 35 grams of crystallized cobalt sulphate ($CoSO_4.7H_2O$) which had been obtained by crystallization from a slightly acid solution having a pH of 1.8. The olefin hydrocarbon mixture had the following characteristics:

| | |
|---|---|
| Density $D_{20}$ | 0.723 |
| Refractive index $n_D^{20}$ | 1.4100 |
| Neutralization number | 0 |
| Ester number | 1.3 |
| Hydroxyl number | 8 |
| Carbonyl number | 0 |

This mixture was treated in an autoclave (having a capacity of 2300 cc.) with water-gas at a temperature of 138 to 140° C. under a pressure of 138 to 193 kilos per sq. cm. Within 88 minutes, a total of 118 kilos per sq. cm. of water-gas pressure had been absorbed with a free gas space of 1200 cc. After cooling and depressurizing, there were obtained 1010 cc. of a reaction product having the following specifications:

| | |
|---|---|
| Carbonyl number | 153 |
| Iodine number | 10 |
| Ester number | 8 |
| Cobalt content mg. Co/liter | 15 |
| Iron content mg. Fe/liter | 15 |

The olefin starting material had an iodine number of 99, while the final product still had an iodine number of 10. By using up the iodine difference of 89, one would at best have been able to obtain a carbonyl number of 159. Inasmuch as the final product has a carbonyl number of 153, an aldehyde yield of 96% was obtained in the water-gas addition reaction.

*Example 4*

From a solution containing mol equivalent quantities of cobalt sulphate and magnesium sulphate and having a pH of 3, a slightly acid double salt of the composition $CoSO_4.MgSO_4.14H_2O$ was obtained by cooling after sufficient evaporation. For the formylation of the hydrocarbon fraction used in Example 3, 80 grams of this double salt were used per 1000 cc. of hydrocarbon, which corresponded to a quantity of metal of 8.8 grams cobalt per 1000 cc. of hydrocarbon mixture. The water-gas addition took place under the same conditions as those indicated in Example 3 and was completed in 90 minutes. The reaction product obtained had the following characteristics:

| | |
|---|---|
| Carbonyl number | 180 |
| Iodine number | 8 |
| Ester number | 8 |
| Cobalt content mg. Co/liter | 38 |
| Iron content mg. Fe/liter | 14 |

The starting material had an iodine number of 102. An iodine number difference of 94 was therefore used up and thus carbonyl number of 168 should have been received. Inasmuch as the final product had a carbonyl number of 180, the aldehyde yield was 95%.

*Example 5*

From a gas mixture (water-gas) containing approximately equal parts by volume of carbon monoxide and hydrogen, there was obtained by the use of iron catalysts, a synthetic hydrocarbon mixture which contained, after extraction of the alcohols and esters present therein, paraffin and olefin hydrocarbons. For the carbonmonoxide hydrogenation, iron catalysts were used which in reduced state contained small quantities of copper, calcium oxide, and alkali in addition to iron metal and iron oxides, i. e. catalysts as generally known in the carbon monoxide hydrogenation. By distillation, a fraction boiling between 160 and 175° C. was obtained therefrom, which fraction consisted essentially of $C_{10}$ hydrocarbons. This mixture contained 47 volumetric percent $C_{10}$ olefins and had the following characteristics:

| | |
|---|---|
| Iodine number | 86 |
| Neutralization number | 0.4 |
| Ester number | 0 |
| Hydroxyl number | 1 |
| Carbonyl number | 7 |

1000 cc. of the olefin mixture which had thus been obtained were introduced into an acid-proof high pressure vessel provided with an agitator and having a useable space of 2300 cc.

100 cc. of an aqueous solution containing 350 grams of cobalt-sulphate-heptahydrate per liter were added to the olefine mixture and the pH was adjusted for with nitric acid to 2.5. The mixture had a total volume of 1100 cc. and contained 7 grams of cobalt in the form of cobalt-sulphate. Above the liquid, there was a gas space of 1200 cc. in the autoclave.

The mixture was brought to 130° C. with constant stirring, whereupon water-gas was introduced until obtaining a pressure of 188 kilos per sq. cm. After 55 minutes, the unsaturated hydrocarbon had absorbed so much water-gas that the gas pressure had dropped by 108 kilos per sq. cm. The reaction was then completed. The mixture was removed from the autoclave and the liquid catalyst solution was separated as the lower layer. There were obtained 1000 cc. of non-aqueous reaction products having the following characteristics:

| | |
|---|---|
| Iodine number | 2 |
| Ester number | 8 |
| Carbonyl number | 136 |

These characteristics showed that the final product contained 41% $C_{11}$ and 5% esters. From the iodine number which remained, it could be concluded that the unsaturated hydrocarbons used had been converted to the extent of approximately 97% in the carbon monoxide and hydrogen addition reaction.

Example 6

From petroleum wax, there was separated by decomposition and distillation of the decomposition product, a hydrocarbon which had a boiling range of 60 to 130° C. Its average C number was $C_7$. The iodine number was 151 and indicated that this hydrocarbon mixture contained 58.5% unsaturates. This product is known in the market as "slak-wax." It is obtained in the deparaffinisation of lubricating oil and possesses a microcrystalline structure.

1000 cc. of this hydrocarbon were treated in the manner indicated in Example 5 with water-gas, a solution of 20 grams cobalt-sulphate-heptahydrate and 10 grams of magnesium-sulphate-heptahydrate in 100 cc. of water being used as catalyst. The catalyst solution had been previously brought to a pH of 2.5 by the addition of nitric acid.

Maintaining a pressure of about 170 kilos per sq. cm. and at 150° C., with a free gas space of 1.13 liters in the reaction vessel, a total of 293 kilos per sq. cm. of water-gas were added with periodic boosting of the pressure.

The reaction product consisted of 52% aldehydes having an average carbon number of $C_8$ and the following characteristics:

| | |
|---|---|
| Iodine number | 3 |
| Neutralization number | 1 |
| Ester number | 5 |
| Hydroxyl number | 1 |
| Carbonyl number | 228 |

Example 7

A Portuguese balsam turpentine oil was freed from its diolefinic constituents by the use of a reduced cobalt catalyst, said diolefinic constituents now turning to monoolefines. From this material, a main fraction boiling between 158 and 163° C. was cut, having an iodine number of 189 and an average molecular weight of 136. The material was then a mono-olefinic bicyclic terpene of the overall formula $C_{10}H_{16}$, having the following characteristics:

| | |
|---|---|
| Density $D_{20}$ | 0.859 |
| Refractive index $n_D^{20}$ | 1.4714 |
| Iodine number | 189 |
| Molecular weight | 136 |

1000 cc. of this product were mixed in an autoclave with 100 cc. of an aqueous solution containing 35 grams of cobalt-sulphate-heptahydrate. By the addition of small quantities of sulphuric acid, the pH was adjusted to a value of 2.8. Thereupon, the mixture was stirred for three hours at 138° C. and under a water-gas pressure of 150 kilos per sq. cm. During this period of time, 389 kilos per sq. cm. of water-gas were absorbed with periodic pressure boosting.

The final product of the water-gas addition reaction had the following characteristics:

| | |
|---|---|
| Iodine number | 10 |
| Neutralization number | 2 |
| Ester number | 14 |
| Hydroxyl number | 6 |
| Carbonyl number | 240 |

By the water-gas addition, there were produced in addition to small quantities of acids, alcohols and esters, principally terpenealdehydes, in a yield of approximately 74% calculated on the iodine number. The rest of the terpenes had passed into higher polymerized products.

We claim:

1. In the method for formylation of olefinic hydrocarbons, the improvement which comprises intimately contacting such an olefinic hydrocarbon with a carbon monoxide hydrogen-containing gas in the presence of a catalyst comprising a double salt solution of cobalt sulfate and magnesium sulfate.

2. Improvement according to claim 1 in which said intimate contacting is effected at a temperature of 100°–220° C.

3. Improvement according to claim 1 in which said catalyst solution has a pH of about 1–3.

4. Improvement according to claim 3 in which said catalyst solution has a pH of 2.5.

5. Improvement according to claim 3 in which said catalyst solution has a pH of 3.

References Cited in the file of this patent

UNITED STATES PATENTS

| | | |
|---|---|---|
| 2,194,186 | Pier et al. | Mar. 19, 1940 |
| 2,327,066 | Roelen | Aug. 17, 1943 |
| 2,440,109 | Moore | Apr. 20, 1948 |
| 2,448,368 | Gresham et al. | Aug. 31, 1948 |
| 2,449,470 | Gresham et al. | Sept. 14, 1948 |
| 2,564,104 | Gresham et al. | Aug. 14, 1951 |
| 2,564,130 | Schreyer | Aug. 14, 1951 |
| 2,576,113 | Hagemeyer et al. | Nov. 27, 1951 |
| 2,641,613 | Mertzweiller et al. | June 9, 1953 |

FOREIGN PATENTS

| | | |
|---|---|---|
| 564,148 | France | Dec. 21, 1923 |

OTHER REFERENCES

I. G. Farben Patent Application I 71, 966 IV d/12o, April 2, 1942, TOM Reel 36, April 18, 1946.